(12) United States Patent
Watanabe et al.

(10) Patent No.: US 10,693,146 B2
(45) Date of Patent: Jun. 23, 2020

(54) PRODUCTION METHOD FOR FINE METAL PARTICLES, PRODUCTION METHOD FOR FUEL CELL ELECTRODE CATALYST, SUPPORTED FINE METAL PARTICLE CATALYST, AND FUEL CELL ELECTRODE CATALYST

(71) Applicant: University of Yamanashi, Kofu-shi, Yamanashi (JP)

(72) Inventors: Masahiro Watanabe, Kofu (JP); Hiroyuki Uchida, Kofu (JP); Hiroshi Yano, Kofu (JP); Makoto Uchida, Kofu (JP)

(73) Assignee: University of Yamanashi, Kofu-shi, Yamanshi (JP)

( * ) Notice: Subject to any disclaimer, the term of this patent is extended or adjusted under 35 U.S.C. 154(b) by 679 days.

(21) Appl. No.: 14/787,196

(22) PCT Filed: Apr. 16, 2014

(86) PCT No.: PCT/JP2014/060833
§ 371 (c)(1),
(2) Date: Oct. 26, 2015

(87) PCT Pub. No.: WO2014/178283
PCT Pub. Date: Nov. 6, 2014

(65) Prior Publication Data
US 2016/0087285 A1    Mar. 24, 2016

(30) Foreign Application Priority Data

May 1, 2013 (JP) .................................. 2013-096502

(51) Int. Cl.
*B22F 9/16* (2006.01)
*B22F 9/22* (2006.01)
(Continued)

(52) U.S. Cl.
CPC ............. *H01M 4/9075* (2013.01); *B22F 9/16* (2013.01); *B22F 9/22* (2013.01); *B22F 9/26* (2013.01);
(Continued)

(58) Field of Classification Search
CPC    H01M 4/9075; B22F 9/16; B22F 9/22; B22F 9/26
See application file for complete search history.

(56) References Cited

U.S. PATENT DOCUMENTS

2005/0075240 A1    4/2005    Yamamoto
2005/0209098 A1    9/2005    Gulla et al.
(Continued)

FOREIGN PATENT DOCUMENTS

JP    11-012608 A    1/1999
JP    2001-224968 A    8/2001
(Continued)

OTHER PUBLICATIONS

Japanese Office Action dated Jun. 13, 2017, issued in corresponding Application No. 2015-514805, 6 pages.
(Continued)

*Primary Examiner* — Ula C Ruddock
*Assistant Examiner* — Frank A Chernow
(74) *Attorney, Agent, or Firm* — Christensen O'Connor Johnson Kindness PLLC

(57) ABSTRACT

Provided is a method for efficiently manufacturing fine metal particles applicable as a fuel cell electrode catalyst. Provided is a method of manufacturing fine metal particles, including the step of: a hydrogen bubbling step to perform bubbling to a reaction solution, wherein: the reaction solution is prepared by allowing seeds of fine metal particles in a dispersed state and a water soluble noble metal precursor to co-exist in a water-containing solvent; and the bubbling is
(Continued)

performed with a reaction gas containing a hydrogen gas, is provided.

13 Claims, 7 Drawing Sheets

(51) Int. Cl.
*B22F 9/26* (2006.01)
*H01M 4/90* (2006.01)
*H01M 4/92* (2006.01)
*B22F 1/00* (2006.01)

(52) U.S. Cl.
CPC ....... *B22F 1/0018* (2013.01); *B22F 2201/013* (2013.01); *B22F 2301/00* (2013.01); *B22F 2301/15* (2013.01); *B22F 2301/20* (2013.01); *B22F 2301/205* (2013.01); *B22F 2301/25* (2013.01); *B22F 2301/255* (2013.01); *B22F 2301/35* (2013.01); *H01M 4/92* (2013.01)

(56) References Cited

U.S. PATENT DOCUMENTS

| | | | |
|---|---|---|---|
| 2009/0005237 A1 | 1/2009 | Kwon et al. | |
| 2011/0081595 A1 | 4/2011 | Ueno | |
| 2011/0275009 A1 | 11/2011 | Goto et al. | |
| 2012/0046164 A1 | 2/2012 | Tanaka | |
| 2012/0214083 A1* | 8/2012 | Norskov | H01M 4/86 429/482 |

FOREIGN PATENT DOCUMENTS

| | | |
|---|---|---|
| JP | 2003-226901 A | 8/2003 |
| JP | 2005-135900 A | 5/2005 |
| JP | 2010-214246 A | 9/2010 |
| JP | 2011-089143 A | 5/2011 |
| JP | 2012-041581 A | 3/2012 |
| WO | 2011/074606 A1 | 6/2011 |
| WO | 20131035698 A1 | 3/2013 |
| WO | 20091096356 A1 | 6/2013 |

OTHER PUBLICATIONS

Ahmadi, R., et al., "Pt—Co Alloy Nanoparticles Synthesized on Sulfur-Modified Carbon Nanotubes as Electrocatalysts for Methanol Electrooxidation Reaction," Journal of Catalysis 292:81-89, Aug. 2012.

Extended European Search Report dated Jul. 7, 2016, issued in corresponding European Patent Application No. EP 14 792 163.9, filed Apr. 16, 2014, 10 pages.

Heck, K.N., "Deactivation Resistance of Pd/Au Nanoparticle Catalysts for Water-Phase Hydrodechlorination," Journal of Catalysis 267(2):97-104, Oct. 2009.

"Platinum Nanoparticles," Wikipedia, the Free Encyclopedia, Mar. 9, 2013, <https://en.wikipedia.org/w/index.php?title=Platinum_nanoparticles&oldid=542941623> [retrieved Jun. 17, 2016], 3 pages.

International Search Report dated Jun. 17, 2014, issued in corresponding International Application No. PCT/JP2014/060833, filed Apr. 16, 2014, 4 pages.

Zhang, J., et al., "Platinum Monolayer on Nonnoble Metal—Noble Metal Core—Shell Nanoparticle Electrocatalysts for $O_2$ Reduction," Journal of Physical Chemistry B 109(48):22701-22704, Dec. 2005.

Eriksson, S., et al., "Preparation of Catalysts from Microemulsions and their Applications in Heterogeneous Catalysis," Applied Catalsyis A: General 265(2): 207-219, Jul. 2004.

Second European Office Action dated Jun. 12, 2018, issued in corresponding European Application No. 14 792 163.9, filed Apr. 16, 2014, 6 pages.

Third European Office Action dated May 27, 2019, issued in corresponding European Application No. 14 792 163.9, filed Apr. 16, 2014, 11 pages.

\* cited by examiner

PRODUCTION METHOD FOR FINE METAL PARTICLES, PRODUCTION METHOD FOR FUEL CELL ELECTRODE CATALYST, SUPPORTED FINE METAL PARTICLE CATALYST, AND FUEL CELL ELECTRODE CATALYST

TECHNICAL FIELD

The present invention relates to a method for efficiently manufacturing fine metal particles which can be used as a fuel cell electrode catalyst, a supported fine metal particle catalyst having uniform particle diameter obtained by the method, and to a fuel cell electrode catalyst.

BACKGROUND

As an electrode catalyst, the ones having activated metal comprising platinum as a main component being supported on a carrier comprising a conductor such as carbon, tin oxide and the like have been used. Regarding various heterogeneous catalysts, the ones having activated metal comprising noble metal, non-noble metal, or alloys thereof as its main component being supported on a carrier comprising oxides such as alumina, titania, magnesia and the like have been used.

The performance of the electrode catalyst depends on the followings:
(1) particle diameter of activated metal,
(2) particle composition of activated metal,
(3) distribution of particle diameter (whether the particle diameter is uniform), and
(4) degree of dispersion on the carrier (whether the activated metal is dispersed uniformly on the carrier).

When the amount of the activated metal supported is the same, the larger the surface area of the activated metal, that is, the smaller the particle diameter and the higher the dispersion degree of the particles, the higher the performance of the activated catalyst. In addition, since platinum is high in cost, micronization of the activated metal, formulation of the activated metal into alloys, and uniform dispersion of the activated metal onto the carrier (supported with high dispersion degree) are required in order to suppress the amount of the activated metal being used.

As a manufacturing method for such electrode catalyst, a method involving the preparation of metal colloid solution by reducing chloroplatinic acid solution with a reducing agent comprising an organic acid, followed by allowing the resulting metal colloid to be supported on the carrier, has been suggested in Patent Literature 1 for example. In addition, as shown in Patent Literature 2, a method involving the preparation of fine particles by reduction using alcohol in the presence of an organic protecting agent, has been suggested.

On the other hand, besides suppressing the amount of platinum being used as mentioned above, usage of alloys as the catalyst has also been studied. Alloy catalyst is important also in terms of activating fuel electrode and air electrode. As the alloy catalyst, alloys of Pt and iron, cobalt, nickel, ruthenium and the like can be mentioned. Conventionally, when the alloy catalyst was manufactured, Pt particles already being supported on carbon was subjected to metal chloride solution by impregnation and the like. Subsequently, the resulting Pt particles were reduced at a high temperature of approximately 900° C. to give the alloy. Further, when the metal salt was to be supported on the carbon as the metal, alloy was manufactured by alcohol reduction. However, regarding the alloy catalyst obtained by such methods, the particle diameter of the catalyst particles was not uniform, and the composition thereof was also not uniform.

In addition, a study has been made to activate the catalyst with smaller amount of Pt. For example, Patent Literatures 3 and 4 disclose an electrode catalyst having a core-shell structure, where both of the core and the shell comprise a noble metal. The noble metal-containing particles used in Patent Literature 3 have a core-shell structure, the core portion comprising the noble metal alloy and the shell portion being formed on the outer periphery of the core portion and having a noble metal layer with a composition different from that of the core portion. In this manufacturing method, the noble metal containing particles are impregnated in strong acid such as concentrated sulfuric acid, and then the transition metal is allowed to elute, thereby increasing the content ratio of the noble metal at the surface of the particles. In addition, in another method, underpotential deposition of Cu is performed with a thickness of one atom layer on the surface of the core catalyst. Then, Cu is immersed in chloroplatinic acid solution to ionize Cu, thereby allowing Pt ion to go under substitution deposition as a zero-valent metal. In this process, a Pt coating having a thickness of approximately one atom layer can be obtained, however, such coating is imperfect, and thus the process need be repeated to form a shell. Therefore, the process becomes complicated and productivity is low.

However, in this method, it is difficult to deposit only the noble metal selectively, or to elute only the non-noble metal selectively so that only the noble metal is provided on the surface of the particles. In Patent Literature 4, thermal treatment is performed under reductive atmosphere, thereby obtaining a core-shell catalyst, the catalyst component composition of the shell comprising an alloy satisfying the relation of "noble metal≥non-noble metal". However, in this method, non-noble metal exists on the outermost surface as the shell layer, and thus activity of catalyst is lowered since the non-noble metal melt under fuel cell operation. In addition, non-Patent Literature 1 discloses of manufacturing a core-shell particle having a Pt monolayer obtained by underpotential deposition. The catalyst obtained by this method uses gold, silver, palladium and the like as the core metal, and Pt is deposited on the surface shell. However, since Pt is a monolayer, stability is low, and thus elution of inner core metal cannot be suppressed sufficiently.

Regarding the operation of the fuel cell, in order to prevent the inner core metal component from eluting during its usage and to prevent the loss of catalyst activity, Patent Literature 5 suggests a manufacturing method of an electrode catalyst having catalyst particles covered with a several-atom layer of platinum skin layer supported on the carrier with high dispersion degree. This manufacturing method comprises the following three processes.

Specifically, the three processes are:
(1) a so-called "first reduction process" to prepare a nanocapsule solution by mixing two types of metal salts, solvent having a hydrophilic group, and a non-aqueous solvent; followed by addition of a non-aqueous solution having a reducing action; and then heating the resulting mixture to form an alloy particle in the nanocapsule,
(2) a so-called "second reduction process" to add a platinum skin precursor to the nanocapsule solution containing the alloy particles prepared in the afore-mentioned process (1), thereby allowing the platinum precursor being covered with the nanocapsule together with the alloy particles, followed by addition of a non-aqueous solution having reducing action to allow deposition of platinum skin layer on the surface of the alloy particles, and (3) a so-called "platinum skin/alloy particles supporting process" to allow the platinum skin/alloy particles be supported on the carrier.

CITATION LIST

Patent Literature

Patent Literature 1: JP 2001-224968A
Patent Literature 2: JP 2003-226901A
Patent Literature 3: JP 2005-135900A
Patent Literature 4: WO 2009/096356
Patent Literature 5: WO 2013/035698

NON-PATENT LITERATURE

Non-Patent Literature 1: J. Phys. Chem. B 2005, 109, 22701

SUMMARY OF THE INVENTION

Technical Problem

The technology disclosed in Patent Literature 5 can maintain the catalyst activity and durability of the electrode catalyst, however, the following problems can be mentioned.

(1) The manufacturing method of the electrode catalyst having the catalyst particles covered with platinum skin layer supported on the carrier with high dispersion degree is complicated. For example, in the "second reduction process", the solvent containing the alloy particles of PtCo formed in the first process is cooled to 60° C., followed by addition of the nanocapsule solution incorporating the platinum precursor (skin precursor solution). Then, the alloy particles formed in the first process (hereinafter abbreviated as n-PtCo/GCB) is incorporated inside the nanocapsule containing the platinum precursor, followed by 15 hours of agitation at 60° C. Finally, reduction reaction is performed by heating under reflux for approximately 20 minutes at approximately 260° C., thereby giving the PtCo particles covered with platinum skin layer (hereinafter abbreviated as 2n-PtCo/GCB) contained in the nanocapsule. Accordingly, the manufacturing process is complicated and requires long time.

(2) The particle diameter of the electrode catalyst can be controlled by altering the size of the nanocapsule, for example. However, when the size of the nanocapsule is made larger, the nanocapsule becomes instable, which can be problematic. Accordingly, optimization of the manufacturing conditions requires burden.

(3) Some of the platinum precursor added are not used for incorporating the alloy particles, and can be reduced and be supported on the carrier. Accordingly, the usage efficiency of platinum is not always high.

From the above viewpoints, a method for manufacturing the electrode catalyst with higher efficiency has been desired in order to avoid high cost in the actual manufacturing process.

The present invention has been made by taking the afore-mentioned circumstances into consideration. An object of the present invention is to provide a method for efficiently manufacturing fine metal particles which can be used as a fuel cell electrode catalyst.

Solution to Problem

According to the present invention, a method of manufacturing fine metal particles, comprising the step of: a hydrogen bubbling step to perform bubbling to a reaction solution, wherein: the reaction solution is prepared by allowing seeds of fine metal particles in a dispersed state and a water soluble noble metal precursor to co-exist in a water-containing solvent; and the bubbling is performed with a reaction gas containing a hydrogen gas, is provided.

The feature of the present invention is, in brief, the noble metal precursor is reduced at the surface of the seeds of fine metal particles by performing bubbling of reactive gas including hydrogen gas (hereinafter also referred to as "hydrogen bubbling") in a condition where the seeds of fine metal particles dispersed in a water-containing solvent (for example, water) and the aqueous noble metal precursor are co-existing, thereby covering the seeds of fine metal particles with a monolayer of the noble metal. The present method is extremely simple, however, such simplicity provides superior features when the fine metal particles are manufactured in large quantity, as described below.

The features of the present invention can be categorized as (1) availability of raw material and the easiness of waste disposal, (2) easiness of manufacture, (3) uniformity of the product, and (4) versatility.

(1) Availability of Raw Material and Easiness of Waste Disposal

The remarkable point in availability of raw material and the easiness of waste disposal is, regarding the present invention, that water can be used as the solvent. Conventional techniques such as those of Patent Literature 5 have used organic solvents. Therefore, the cost for the organic solvent itself and the cost for treating the organic solvent after reaction was completed, were necessary. On the other hand, such costs are not required in the present invention, and thus manufacturing cost can be reduced.

Further, in the present invention, commonly-used compounds such as hexachloroplatinic (IV) acid can be used as the noble metal precursor. When the noble metal precursor is reduced, inexpensive hydrogen gas can be used instead of expensive reducing agent such as trimethyl lithium borohydride ($LiB(CH_2CH_3)_3H$) used in Patent Literature 5. Accordingly, neither special raw material nor special gas are not required when carrying out the present invention, and thus the cost of raw material can be suppressed.

(2) Easiness of Manufacture

In the present invention, reduction reaction of the noble metal precursor can be carried out under extremely mild conditions (for example, room temperature to 60° C., diluted hydrogen (approximately 5%)). In addition, the time required for the reduction reaction is extremely short as 30 minutes to 1 hour. Since reduction reaction of the noble metal precursor required approximately 15 hours in Patent Literature 5, it is innovative that the reduction reaction can be carried out in such short time. In addition, since the reduction operation can be conducted with hydrogen concentration below the explosion limits, the exhaust gas can be discharged to atmosphere as it is. Therefore, a special facility to avoid danger is not necessary, achieving a large merit. In addition, since the product obtained by the reduction reaction is an aqueous solution containing the catalyst and a small amount of hydrogen chloride, there is hardly any impact on the environment. Accordingly, a very simple filtration and rinsing with water would give the supported catalyst. As described, according to the present invention, the product can be obtained by performing the reduction reaction under mild conditions for a short period of time, followed by a simple separation operation, and thus the manufacturing cost can be suppressed.

In addition, the method of Patent Literature 5 involves complicated manufacturing processes, and thus there are many parameters that need be adjusted. For example, when the particle diameter of the fine metal particles is altered, it is not easy to decide on which parameter should be adjusted, and how the parameter should be adjusted. On the other hand, in the present invention, since the manufacturing processes are extremely simple, alteration of the particle diameter of the fine metal particles can be conducted easily. For example, when it is desired to make the particle diameter of the fine metal particles larger, the addition amount of the aqueous solvent and the noble metal precursor should be increased and hydrogen bubbling should be performed simply.

(3) Uniformity of Product

In the present invention, the entirety of the noble metal precursor is substantially used for covering the seeds of fine metal particles, and the noble metal precursor hardly gets reduced in a state separately from the seeds of alloy particles. Therefore, when the alloy particles are used as the seeds of fine metal particles of the present invention, nearly all of the fine metal particles obtained would have a structure in which the alloy particles are covered with the noble metal. On the contrary, in the method of Patent Literature 5, a part of the noble metal precursor would be reduced independently from the alloy particles. Accordingly, particles having a structure in which the alloy particles are covered with noble metal and particles of the noble metal itself were mixed, and thus there was some degree of ununiformity. With the method of the present invention, uniformity of the product can be improved.

In addition, the reduction reaction of the metal precursor occurs evenly uniformly on the surface of each of the fine metal particles. Therefore, the particle diameter distribution of the fine metal particles is a sum of the particle diameter distribution of the fine metal particles and the thickness of the covering layer by the noble metal. Accordingly, when seeds of fine metal particles having a sharp particle diameter distribution are prepared, the resulting product of fine metal particles would also have a sharp particle diameter distribution. Further, when the seeds of fine metal particles are supported on a carrier, the reduction deposition reaction of the metal precursor occurs evenly at the surface of each one of the seeds of fine metal particles supported. Accordingly, the dispersion condition of the fine metal particles obtained as the product would carry the dispersion condition of the seeds of fine metal particles on the carrier. Therefore, if seeds of fine metal particles having superior dispersion condition are prepared, the dispersion condition of the obtained fine metal particles would also be superior.

(4) Versatility

Since the efficacy of the method of the present invention has low relevancy with the type of the seeds of fine metal particles and with the type of the noble metal precursor, any combination can be used so long as the reduction reaction of the noble metal precursor occur at the surface of the seeds of fine metal particles. The metal of the seeds of fine metal particles and the metal of the noble metal precursor may be the same or may be different from each other.

Here, one application of the fine metal particles manufactured by the method of the present invention is the usage as the fuel cell electrode catalyst. Since the fuel cell electrode catalyst is not the only application which requires particle growth or skin layer formation, the present invention can be applied to the manufacture of fine metal particles used for various purposes which require particle growth or skin layer formation with the superior method of the present invention.

As described, the present invention is an extremely superior method having the afore-mentioned features of (1) to (4). The essential findings that lead to the accomplishment of the present invention is that when hydrogen bubbling is performed in the presence of the seeds of fine metal particles and the water-containing solvent, the reduction reaction of the metal precursor occur only at the surface of the seeds of fine metal particles. Although the principle of such finding is not fully revealed, it is hypothesized that the condition of co-existence of seeds of fine metal particles, water-containing solvent, and hydrogen gas allows lowering of the activation energy of the reduction reaction of the metal precursor at the surface of the seeds of fine metal particles.

Hereinafter, various embodiments of the present invention will be exemplified. The embodiments shown below can be combined with each other.

Preferably, the seeds of fine metal particles have an average particle diameter of 1 to 8 nm.

Preferably, the seeds of fine metal particles are supported on a carrier and are dispersed.

Preferably, a value of pH of the reaction solution when the bubbling is started is 0 or higher.

Preferably, the method further comprises the step of: a boiling step to boil the reaction solution before the hydrogen bubbling step.

Preferably, the water-containing solvent is removed after the hydrogen bubbling step, followed by addition of the noble metal precursor and the water-containing solvent, and then the hydrogen bubbling is performed again, thereby meeting the demands for increasing the coating layer of the noble metal.

Preferably, the reaction gas has a hydrogen gas concentration of 0.1 to 100%.

Preferably, the reduction operation is terminated when remaining amount of the noble metal precursor in the reaction solution becomes 10% or lower, preferably 1% or lower. When the reaction solution is colored by the noble metal precursor, the hydrogen bubbling step is terminated when the reaction solution becomes colorless and transparent.

Preferably, the seeds of fine metal particles are selected from a group consisting of a noble metal, a non-noble metal, an alloy of two or more noble metals, and an alloy of noble metal and non-noble metal.

Preferably, the seeds of fine metal particles are an alloy of noble metal and non-noble metal, and the method further comprises the step of: a thermal treatment step to perform a thermal treatment with the seeds of fine metal particles under reductive atmosphere before adding the seeds of fine metal particles to the reaction solution.

Preferably, the noble metal comprises at least one metal selected from the group consisting of platinum, palladium, rhodium, iridium, ruthenium, and gold; and the non-noble metal comprises at least one metal selected from the group consisting of iron, cobalt, nickel, manganese, chromium, vanadium, titanium, niobium, molybdenum, lead, and tungsten.

Preferably, the noble metal precursor is selected from the group consisting of acid of noble metal, salt of noble metal, and complex of noble metal.

Preferably, the noble metal precursor comprises at least one metal selected from the group consisting of platinum, palladium, rhodium, iridium, ruthenium, and gold.

Preferably, the noble metal precursor is selected from the group consisting of chloroplatinic acid, chloroplatinate salt, and platinum ammine complex.

Preferably, the seeds of fine metal particles are supported on an electron conductive carrier; and the seeds of fine metal particles are an electrode catalyst of fuel cell.

The present invention provides supported fine metal particles comprising: a plurality of fine metal particles supported on a carrier; wherein: the fine metal particles have an average particle diameter of 2 to 12 nm; 70% or more of the fine metal particles have a particle diameter within ±30% of the average particle diameter; and 80% or more of the fine metal particles have a structure covered with a noble metal skin layer without any gap; and a fuel cell electrode catalyst comprising the supported fine metal particles.

Preferably, the noble metal skin layer is 1 to 4 atom layer.

DETAILED DESCRIPTION OF PREFERRED EMBODIMENTS

Figure 1:
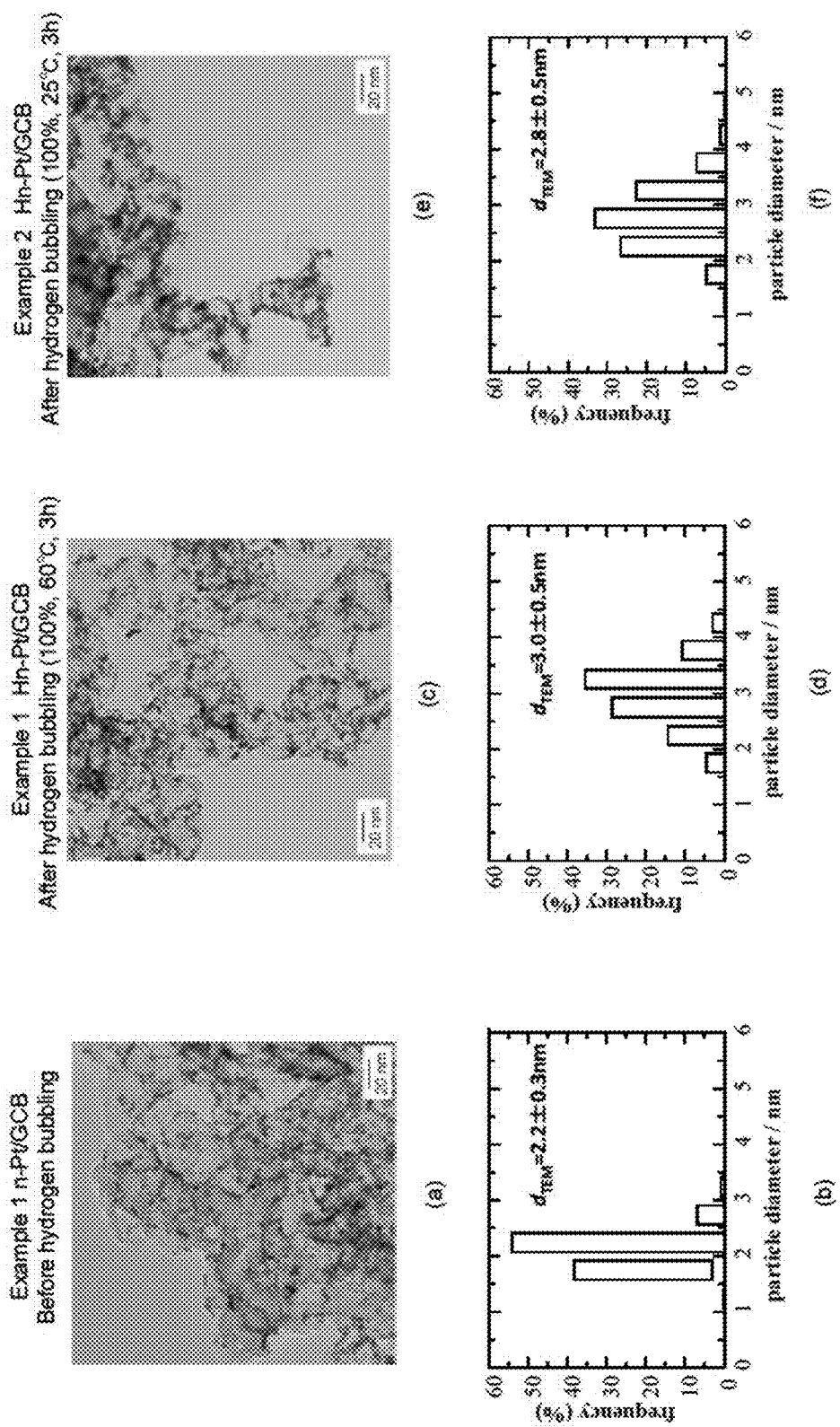
FIG. 1 shows a summary of the study regarding the effect of reducing temperature to the particle diameter distribution, obtained from Example 1 and Example 2. Here, (a) and (b) are TEM image of n-Pt/GCB and particle diameter distribution obtained from the image, respectively; (c) and (d) are TEM image of the sample after hydrogen bubbling (Example 1, 100%, 60° C.) (Hn-Pt/GCB) and particle diameter distribution obtained from the image, respectively; and (e) and (f) are TEM image of the sample after hydrogen bubbling (Example 2, 100%, 25° C.) (Hn-Pt/GCB) and particle diameter distribution obtained from the image, respectively. In the reaction conditions ranging from a mild condition of 25° C. to a severe condition of 60° C., there was no remarkable difference, and particle diameter was increased similarly with a sharp particle diameter distribution.

Hereinafter, various embodiments of the present invention will be described. The embodiments shown hereinafter are merely an exemplification, and the method of the present invention shall not be limited to those described hereinafter.

1. Seeds of Fine Metal Particles

There is no particular limitation regarding the type of the seeds of fine metal particles, so long as the reduction reaction of the metal precursor can progress on its surface by hydrogen bubbling. The constitutional metal of the seeds of fine metal particles can be any one selected from the group consisting of a noble metal, a non-noble metal, an alloy of two or more noble metals, and an alloy of noble metal and non-noble metal. As an example of the noble metal, platinum, palladium, rhodium, iridium, ruthenium, and gold can be mentioned. As an example of the non-noble metal, iron, cobalt, nickel, manganese, chromium, vanadium, titanium, niobium, molybdenum, lead, and tungsten can be mentioned. There is no particular limitation regarding the average particle diameter of the seeds of fine metal particles. Here, for example, the average particle diameter is 1 to 8 nm. When the average particle diameter is too small, it would be difficult to prepare the seeds of fine metal particles stably. On the other hand, when the average particle diameter is too large, the average particle diameter of the resulting fine metal particles would also be large, and thus the mass activity (catalyst activity per unit mass) tends to become low. Examples of the average particle diameter of the seeds of fine metal particles are, 1.0, 1.5, 2.0, 2.5, 3.0, 3.5, 4.0, 4.5, 5.0, 5.5, 6.0, 6.5, 7.0, 7.5, and 8.0 nm, and the average particle diameter can be in the range of two values selected from these. Here, in the present specification, "average particle diameter" is the one obtained by measuring the diameter of the circumscribed circle for each fine particles and then calculating the average of the diameter. The number of samples observed is 500 or more, for example. Here, it is preferable that the particle diameter of the seeds of fine metal particles is as even as possible. It is preferable that 70% or more of the seeds of fine metal particles have the particle diameter within ±30% of the average particle diameter, and further preferable that 70% or more of the seeds of fine metal particles have the particle diameter within ±25%, ±20%, or ±15% of the average particle diameter.

It is preferable that the seeds of fine metal particles are supported on a carrier (preferably an electron conductive carrier), however, the seeds of fine metal particles are not limited to such, and may be in the form of a powder, or may be floating in water-containing solvent. There is no particular limitation regarding the carrier, and examples of the carrier include nano-particles of carbon black, amorphous carbon, carbon nanotubes, carbon nanohorns, tin oxide, and titanium oxide. There is no particular limitation regarding the amount of the catalyst particles being supported. Here, the amount of the catalyst is 10 to 100 wt % with respect to the carrier. The amount of the catalyst being supported can be, for example, 10, 20, 30, 40, 50, 60, 70, 80, 90, and 100 wt %, and can be in the range of two values selected from these.

As the method for allowing the seeds of fine metal particles to be supported on the carrier, as disclosed in Patent Literature 5 for example, a method involving mixing of a solvent having a hydrophilic group and a non-aqueous solvent to form a nano-capsule, allowing the seeds of metal precursor be encapsuled in the nano-capsule, and then reducing the seeds of metal precursor to prepare a nano-capsule solution containing the seeds of fine metal particles. Subsequently, the nano-capsule solution is mixed with the carrier, followed by ordinary methods such as agitation.

As the solvent having a hydrophilic group, an organic solvent having a hydroxyl group can be mentioned, such as higher alcohol for example. As the non-aqueous solvent, an organic solvent which can form a nano-capsule by mixing with the afore-mentioned solvent having the hydroxyl group can be mentioned, such as higher ethers, aromatic ethers, higher esters and the like. Seed of metal precursor is a compound which serves as the raw material for forming the seeds of fine metal particles after being reduced. For example, seed of metal precursor is one type or two or more types of metal salt or a metal complex. Reduction of the seed of metal precursor is preferably conducted by heating under the supply of non-aqueous liquid having a reducing effect. As the non-aqueous liquid having the reducing effect, non-aqueous liquid containing $MBR_3H$, $MH$ (here, M represents lithium, sodium, or potassium; and R represents a hydrogen atom or a hydrocarbon group, wherein the hydrocarbon group can be a linear hydrocarbon group or a branched hydrocarbon group, and can be saturated or non-saturated), metal derivatives of alcohol and naphthalene can be used.

Preferably, mixing of the nano-capsule solution and the carrier is performed by adding the nano-capsule solution dropwise to the solution obtained by dispersing the carrier in alcohol, preferably lower alcohol (carbon number of 1, 2, 3, 4, 5, or 6) such as ethanol and methanol. Since the nano-capsule has a hydrophobic group at its outer side, the electrical charge repulsion of the hydrophobic group allows the arrangement of the particles on the surface of the carrier without coming too close with each other. Therefore, the catalyst particles can be supported on the carrier with high dispersion degree. In addition, it is preferable to allow the catalyst particles be adhered onto the surface of the carrier, and then perform the thermal treatment as a subsequent process. As such, the nano-capsule component remaining on the catalyst particles can be decomposed and removed completely. In the remaining nano-capsule component, a hydrophobic group and the like such as an alkyl group is contained. The thermal treatment is preferably performed under inert gas atmosphere such as argon, nitrogen, and helium. Although the temperature of the thermal treatment varies depending on the type of the metal, the type of the metal salt, metal complex as the raw material, and the reagent, it is preferable that the temperature of the thermal treatment is in the temperature range so that the nano-capsule component can be decomposed and the decomposition reaction would not be too slow, and also in the temperature range lower than the temperature at which aggregation of the catalyst particles would occur. For example, the temperature of the thermal treatment is 500° C. or lower, preferably 250 to 400° C. Specific examples of such temperature are, 100, 150, 200, 250, 300, 350, 400, 450, and 500° C.; and the temperature of the thermal treatment can be in the range of two values selected from these. In addition, when the seeds of fine metal particles comprise an alloy of a noble metal and a non-noble metal (for example, platinum alloy (alloy of platinum and metal other than platinum)), it is preferable to perform the thermal treatment under reductive atmosphere (for example, under hydrogen gas atmosphere). When this thermal treatment is performed, the noble metal atom (for example, platinum atom) existing inside the seeds of fine metal particles move to the surface of the seeds of fine metal particles, and thus the rate of area occupied with the noble metal atom increases at the surface of the seeds of fine metal particles. Accordingly, in the hydrogen bubbling process, elution of the non-noble metal atom can be suppressed. The temperature of the thermal treatment is, for example, 120 to 500° C. Specific examples of such temperature are, 120, 150, 200, 250, 300, 350, 400, 450, and 500° C.; and the temperature of the thermal treatment can be in the range of two values selected from these.

2. Water Soluble Noble Metal Precursor

Noble metal precursor is a compound which serves as a raw material for forming the noble metal by being reduced. For example, acid, salt, and complex of noble metal can be mentioned. As the noble metal precursor, for example, a noble metal acid chloride and salts thereof (for example, potassium salt), ammine complex of noble metal, ethylene-diamine complex of noble metal, acetylacetonato complex of noble metal and the like can be used. When the noble metal is platinum, chloroplatinic acid (for example, hexachloroplatinic acid, tetrachloroplatinic acid), bis(acetylacetonato)platinum ($Pt(acac)_2$), chloroplatinate salt (for example, potassium tetrachloroplatinate ($K_2PtCl_4$)), platinum ammine complex and the like can be used.

Since the hydrogen bubbling of the present invention is conducted in a water-containing solvent, the noble metal precursor need be water soluble. It is preferable that the noble metal precursor has a high solubility so that the entire amount of the noble metal precursor is dissolved at the beginning of the hydrogen bubbling. Here, the solubility can be at a level in which a portion of the noble metal precursor is left undissolved.

3. Water-Containing Solvent, Reaction Solution

Water-containing solvent is a solvent containing water, preferably purified water. Here, component other than water (for example, lower alcohol) can be contained so long as it does not completely inhibit the reduction reaction of the noble metal precursor. It is preferable that the water content of the water-containing solvent is high as possible. Specific examples of the water content of the water-containing solvent are, 50, 60, 70, 80, 85, 90, 95, 99, and 100 volume %; and the temperature of the water content can be in the range of two values selected from these.

The reaction solution for performing the hydrogen bubbling can be obtained by dispersing the seeds of fine metal particles and dissolving the noble metal precursor in the water-containing solvent. In one example, a dispersion solution having the seeds of fine metal particles dissolved in the water-containing solvent by ultrasonic dispersion, and a solution having the noble metal precursor dissolved in the water-containing solvent are prepared. Subsequently, these two solutions prepared are mixed to prepare the reaction solution. As another method, a method in which the seeds of fine metal particles are dispersed in a solution prepared by dissolving the noble metal precursor in the water-containing solvent, and a method in which the noble metal precursor is dissolved in a dispersion solution prepared by dispersing the seeds of fine metal particles in the water-containing solvent by ultrasonic dispersion, can be mentioned.

4. Hydrogen Bubbling

Hydrogen bubbling can be performed by circulating a reaction gas containing hydrogen gas in the reaction solution. As the reaction gas, pure hydrogen gas can be used, or a diluted hydrogen gas diluted with another gas (for example, inert gas such as argon, nitrogen, and the like). The reduction reaction of the noble metal precursor by hydrogen bubbling is hardly effected by the concentration of hydrogen gas in the reaction gas. The concentration of hydrogen gas in the reaction gas is, for example, 0.1 to 100%. Here, in view of safety issues, the concentration of hydrogen gas is preferably in the range in which hydrogen explosion do not occur, and is preferably 0.1 to 5% or 95 to 100%. In addition, since the particle diameter distribution of the fine metal particles as the product becomes sharp when the concentration of hydrogen gas in the reaction gas is low, the concentration of hydrogen gas is preferably 0.1 to 30%. Specific examples of the concentration of hydrogen gas are, 0.1, 1, 5, 10, 20, 30, 40, 50, 60, 70, 80, 90, 95, and 100; and the concentration of hydrogen gas can be in the range of two values selected from these. There is no limitation regarding the time period for performing the hydrogen bubbling, so long as the reduction reaction of the noble metal precursor occur in the time period. Here, the time period is 0.5 to 30 hours, preferably 0.5 to 10 hours, and more preferably 0.5 to 5 hours. When the time period for performing the hydrogen bubbling is too short, the reduction reaction of the noble metal precursor would not be completed, and thus the noble metal precursor can be wasted, which is unfavorable. Here, the reduction reaction of the noble metal precursor is usually completed within 0.5 to several hours. Therefore, further hydrogen bubbling would only result in higher manufacturing cost, which is unfavorable. Specific examples of the time period for performing hydrogen bubbling are, 0.5, 1, 2, 3, 4, 5, 6, 7, 8, 9, 10, 15, 20, and 30 hours; and the time period can be in the range of two values selected from these. In addition, it is preferable to terminate the reduction operation when the amount of remaining noble metal precursor in the reaction solution becomes 10% or lower, preferably 1% or lower. When the reaction solution is colored derived from the noble metal precursor, the hydrogen bubbling can be terminated when the reaction solution turns colorless and transparent by consumption of the noble metal precursor. By this method, the noble metal precursor would not be wasted, and the hydrogen bubbling can be completed with relatively short period of time. For example, when the noble metal precursor is hexachloroplatinic acid, the reaction solution would be yellow, and thus when the color of yellow vanishes and the reaction solution turns colorless and transparent, it can be determined that the noble metal precursor has been totally consumed from the reaction solution.

There is no particular limitation regarding the temperature of the reaction solution during the hydrogen bubbling, so long as the reaction solution would not solidify or evaporate. For example, the temperature of the reaction solution under atmospheric pressure is 0.1 to 100° C. Here, taking into consideration the workability, the temperature of the reaction solution is preferably 15 to 60° C. Specific examples of the temperature of the reaction solution are, 0.1, 1, 5, 10, 15, 20, 25, 30, 35, 40, 45, 50, 55, 60, 65, 70, 75, 80, 85, 90, 95, 99.9, and 100° C.; and the temperature can be in the range of two values selected from these.

There is no particular limitation regarding the value of pH of the reaction solution during the hydrogen bubbling, so long as the reduction reaction of the noble metal precursor occurs. Here, when the value of pH is too low, it becomes difficult for the reduction reaction to occur. Accordingly, the value of pH when the hydrogen bubbling is started is preferably 0 or higher. Here, since higher value of pH allows the usage of hydrogen gas with lower concentration, explosion limit can be avoided more easily. Therefore, it is more preferable that the value of pH is 1 or higher. Although the upper limit of the value of pH is not particularly limited, the noble metal precursor tends to precipitate as a hydroxide when the value of pH is too high and exceeds 10. Accordingly, the pH is preferably 10 or lower, more preferably 4 or lower. The value of pH of the reaction solution is, for example, 0 to 14. Specific examples of the value of pH are, 0, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, and 14; and the value of pH can be in the range of two values selected from these.

The value of pH of the reaction solution is, when adjustment of the value of pH is not conducted separately, determined by the concentration of the noble metal precursor. For example, when the noble metal precursor is a noble metal acid (for example, hexachloroplatinic acid ($H_2PtCl_6$)), hydrogen ions would be released by the dissociation of the hydrogen ion in the water-containing solvent. Accordingly, higher concentration of the noble metal precursor would result in lower value of pH. In addition, since the noble metal precursor is reduced by dissociation of the hydrogen ion, too low value of pH would make the dissociation of the hydrogen ion difficult, and thus the reduction reaction would become difficult to occur. When the concentration of the noble metal precursor is not that high, it is preferable not to conduct adjustment of the value of pH and prepare the reaction solution by simply dissolving the noble metal precursor in the water-containing solvent, since the procedure would be simple. On the other hand, when it is desired to have higher concentration of the noble metal precursor, the value of pH can be adjusted by adding a suitable amount of a base such as sodium hydroxide or potassium hydroxide so that the value of pH does not become too low. Here, since reduction in the value of pH can be suppressed by using noble metal salt (for example, potassium tetrachloroplatinate) or noble metal complex (for example, bis(acetylacetonato)platinum) in place of noble metal acid, the value of pH of the reaction solution can be kept in a suitable range without conducting adjustment of the value of pH. Here, another method for keeping the value of pH of the reaction solution in a suitable range is to increase the amount of the water-containing solvent to lower the hydrogen ion concentration. Further, after performing the hydrogen bubbling with a reaction solution having relatively low concentration of the noble metal precursor, the water-containing solvent can be removed, and then the noble metal precursor and the water-containing solvent can be added, followed by further hydrogen bubbling process.

Here, the seeds of fine metal particles can have water repellent property against the water-containing solvent due to residual organic substances during its manufacturing process. In such cases, the seeds of fine metal particles would not come in contact with the water-containing solvent properly, resulting in cases where the noble metal skin layer is not be formed properly. In such cases, it is preferable to boil the reaction solution before the hydrogen bubbling. The seeds of fine metal particles floating in the reaction solution before boiling would sink by the boiling process, and then the seeds of fine metal particles would certainly come in contact with the water-containing solvent when the hydrogen bubbling is performed in such condition. Accordingly, the reduction reaction of the noble metal precursor on the seeds of fine metal particles would not be inhibited.

5. Fine Metal Particles

By the hydrogen bubbling process, the noble metal precursor is reduced at the surface of the seeds of fine metal particles, and a noble metal skin layer would be formed so as to cover the seeds of fine metal particles, thereby obtaining the fine metal particles as the product.

In the method of conventional technique, the ratio of the seeds of fine metal particles having a structure covered with the noble metal skin layer without any gap was not always high. On the contrary, in the method of the present invention, almost total amount (for example, 80% or more of the fine metal particles, preferably 95% or more, and further preferably 99% or more) of the fine metal particles have the afore-mentioned structure. Therefore, the uniformity of the fine metal particles is extremely high.

There is no particular limitation regarding the thickness of the noble metal skin layer. Here, 1 to 4 atom layer is preferable, and 1.5 to 3 atom layer is more preferable. When the noble metal skin layer is too thin, there are cases where the seeds of fine metal particles would not be covered sufficiently, and when the noble metal skin layer is too thick, there are cases where the electronic effect of the seeds of fine metal particles would be shielded by the noble metal skin layer. Specific examples of the thickness of the noble metal skin layer are, 1, 1.5, 2, 2.5, 3, 3.5, and 4 atom layer; and the value of the thickness can be in the range of two values selected from these. Here, with respect to platinum, 1 atom layer is approximately 0.225 nm. Therefore, when the noble metal skin layer is 2 atom layers, the average particle diameter of the fine metal particles would be approximately 0.9 nm larger than the seeds of fine metal particles.

There is no particular limitation regarding the average particle diameter of the fine metal particles. For example, the average particle diameter is 2 to 12 nm. Specific examples of the average particle diameter are, 2, 2.5, 3, 3.5, 4, 4.5, 5, 5.5, 6, 6.5, 7, 7.5, 8, 8.5, 9, 9.5, 10, 10.5, 11, 11.5, and 12 nm; and the value of the average particle diameter can be in the range of two values selected from these. When the average particle diameter of the fine metal particles becomes small, the specific surface area becomes large, thereby achieving superior mass activity. However, such fine metal particles would be unstable since they easily elute or aggregate. Therefore, when the fine metal particles are used under severe conditions such as those used as a fuel cell electrode catalyst for automobiles, the average particle diameter of the fine metal particles is made relatively large in order to prioritize stability. On the other hand, when the fine metal particles are used under relatively mild conditions, the average particle diameter of the fine metal particles can be made relatively small in order to prioritize improvement in mass activity. As described, the preferable average particle diameter of the fine metal particles is decided depending on the use, and the average particle diameter of the seeds of fine metal particles and the thickness of the noble metal skin layer are controlled so as to obtain the fine metal particles having appropriate average particle diameter. The thickness of the noble metal skin layer can be controlled by adjusting the amount of the noble metal precursor being added.

In addition, it is preferable that the particle diameter of the fine metal particles is as even as possible. It is preferable that 70% or more of the fine metal particles have the particle diameter within ±30% of the average particle diameter, and further preferable that 70% or more of the fine metal particles have the particle diameter within ±25%, ±20%, or ±15% of the average particle diameter.

When the seeds of fine metal particles are supported on a carrier, the fine metal particles as the product would also be supported on the carrier. Accordingly, the fine metal particles can be used as the fuel cell electrode catalyst as it is. When the fine metal particles are not supported on the carrier, such fine metal particles can be made to be supported on the carrier by following the method described in "1. Seeds of Fine Metal Particles".

As described, the method of the present invention is superior in that fine metal particles having superior characteristics as the fuel cell electrode catalyst can be manufactured with simple processes and shorter time. Here, the method of the present invention can be utilized in other technical fields. For example, the method of the present invention can be used in the field of environmental catalyst and sensors where the heterogeneous interface reaction at the boundary of the vapor phase or the liquid phase and the catalyst need be accelerated, or in the field of petrochemistry synthesis/decomposition catalyst.

EXAMPLES

Hereinafter, an Example of controlling of the particle diameter by Pt deposition onto the seeds of metal catalysts (n-Pt/GCB, n-PtCo/GCB), the seeds of metal catalysts (n-Pt/GCB, n-PtCo/GCB) obtained by allowing Pt alone or PtCo alloy be supported on graphite carbon black (GCB).

1. Example 1 n-Pt/GCB+Pt Skin (Hn-Pt/GCB), 100% Hydrogen Bubbling, 60° C., 3 h 1-1. Preparation of n-Pt/GCB Pt(acac)$_2$ (0.125 mmol, 49 mg), 1,2-hexadecanediol (1 mmol, 260 mg), and diphenyl ether (12.5 ml, 13.5 g, 79.3 mmol) were charged in a beaker, and the mixture was agitated and mixed for 10 minutes at an elevated temperature of 100° C. using a stirrer. Subsequently, oleic acid (0.25 mmol, 85 µl) and oleylamine (0.25 mmol, 80 µl) were added, and the temperature was raised to 200° C. with agitation. Then, the mixture was further agitated for 20 minutes to give a nano-capsule solution. To the nano-capsule solution thus obtained, 1M LiB(C$_2$H$_5$)$_3$H·THF solution (1.0 ml, 1 mmol) was added dropwise over 2 minutes, and the mixture was agitated for 5 minutes. Then, the temperature of the mixture was raised to 260° C., and the reduction reaction was carried out at this temperature under reflux for 20 minutes. Accordingly, solution A containing Pt particles in the nano-capsule was obtained. Then, solution A was cooled to approximately 100° C., and graphite carbon black (GCB, 150 m$^2$/g) was added so that the amount of Pt supported would be 27.2 wt % with respect to the amount of carbon black. The mixture was agitated, filtered, and the filtrate was subjected to vacuum drying at 60° C. Subsequently, the remaining organic solvent was removed by heating under nitrogen gas at 200° C. for 4 hours to obtain the Pt fine particles supported on GCB, n-Pt/GCB.

1-2. Preparation of n-Pt/GCB

The n-Pt/GCB (50 mg) thus obtained was dispersed in purified water (10 mL) by ultrasonic dispersion, thereby preparing n-Pt/GCB dispersion.

1-3. Preparation of Pt Skin Precursor Solution

As the Pt skin precursor, hexachloroplatinic (IV) acid (H$_2$PtCl$_6$·6H$_2$O), in an amount for 2 atom layers of Pt was dissolved in purified water (10 mL), thereby preparing the Pt skin precursor solution.

1-4. Hydrogen Bubbling

The afore-mentioned n-Pt/GCB dispersion solution and the afore-mentioned Pt skin precursor solution were mixed and agitated, thereby preparing the reaction solution. The value of pH of this reaction solution was 2.5.

Subsequently, the tip of the glass tube for circulating hydrogen gas was placed in the reaction solution, and hydrogen bubbling was performed at 60° C. for 3 hours using 100% hydrogen gas. The color of the reaction solution was yellow when the hydrogen bubbling was started, and the reaction solution was colorless and transparent at the end of the hydrogen bubbling.

After completion of the hydrogen bubbling, the solids were taken by filtration, and the solids were dried to obtain Hn-Pt/GCB.

1-5. Evaluation

TEM image was taken for n-Pt/GCB before hydrogen bubbling and the sample formed with the Pt skin layer by hydrogen bubbling (Hn-Pt/GCB). Particle diameter of 500 fine particles in the TEM image was measured, and particle diameter distribution was obtained. The results are shown in FIG. 1 (a) to (d). According to FIG. 1 (a) to (b), Pt fine particles are uniformly dispersed in the case of n-Pt/GCB, and thus it can be understood that the distribution width of the particle diameter is extremely narrow. In addition, when FIGS. 1(a) and (c) are compared, it can be understood that particle diameter of each of the Pt fine particles supported on GCB are enlarged. Further, when particle diameter distribution of FIGS. 1(b) and (d) are compared, it can be understood that average particle diameter $d_{TEM}$ was increased by approximately 0.8 nm (approximately by 2 atom layer of Pt) with Hn-Pt/GCB. In addition, it can be understood from the amount of the Pt skin precursor charged and the amount of increase in the average particle diameter that almost total amount of the Pt skin precursor was consumed for forming the Pt skin layer. Here, $d_{TEM}$ in the figures are described as "2.2±0.3" for example. The value after ±shows standard deviation (nm). Approximately 70% of the particle diameters measured are within the range of the value with the provided plus and minus.

2. Example 2 n-Pt/GCB+Pt Skin (Hn-Pt/GCB), 100% Hydrogen Bubbling, 25° C., 3 h

The temperature of the reaction solution during the hydrogen bubbling was altered to 25° C., and the experiment and evaluation were performed in a similar manner as Example 1. The results are shown in FIG. 1(e) to (f). As shown in FIG. 1(e), it can be understood that the particle diameter of each of the Pt fine particles supported on GCB were made large. In addition, as shown in FIG. 1(f), the average particle diameter $d_{TEM}$ was increased by approximately 0.6 nm. These results show that reduction reaction of the Pt skin precursor occurred by hydrogen bubbling even at a low temperature as 25° C., thereby forming the Pt skin layer.

3. Example 3 n-Pt/GCB+Pt Skin (Hn-Pt/GCB), 5% Hydrogen Bubbling, 25° C., 1 h

Figure 2:
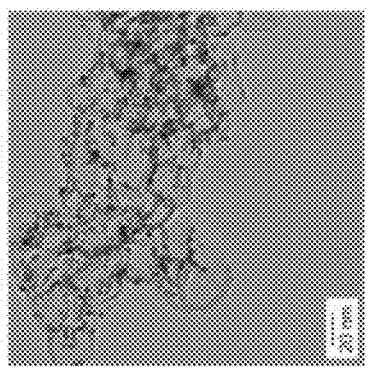
FIG. 2 shows a summary of the study regarding the effect of milder reducing conditions of Example 3 (lower hydrogen concentration, shorter reduction period) compared with those of Example 2, with respect to the particle diameter distribution at 25° C. Here, (a) and (b) are TEM image of the sample after hydrogen bubbling (Example 3, 5%) (Hn-Pt/GCB) and particle diameter distribution obtained from the image, respectively. Catalyst having similar particle diameter as the catalyst obtained with the conditions of 100%, 3 hours was generated under the reduction conditions of 5%, 1 hour.
Figure 2:
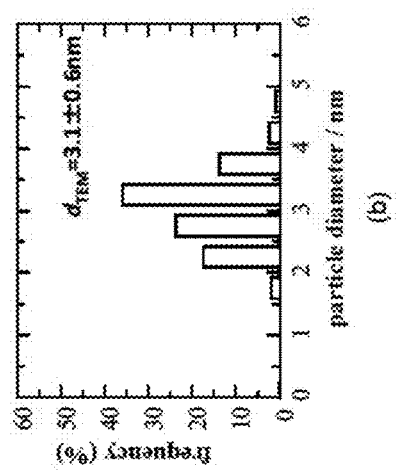

In Example 3, the conditions for the hydrogen bubbling were altered to a hydrogen concentration of 5%, a temperature of 25° C., and the time period of 1 hour, and the experiment and evaluation were performed in a similar manner as Example 1. The results are shown in FIG. 2(a) to (b). As shown in FIG. 2(a), it can be understood that the particle diameter of each of the Pt fine particles supported on GCB were made large. In addition, as shown in FIG. 2(b), the average particle diameter $d_{TEM}$ was increased by approximately 0.9 nm. These results show that almost total amount of the Pt skin precursor were reduced and consumed for the formation of the Pt skin layer, even when the hydrogen bubbling was conducted under the conditions of low concentration, low temperature, and short time, such as hydrogen concentration of 5%, temperature of 25° C., and time period of 1 hour.

4. Examples 4 to 6 n-Pt/GCB+Pt Skin (Hn-Pt/GCB), 5% Hydrogen Bubbling, 40 to 80° C., 1 h

Figure 3:
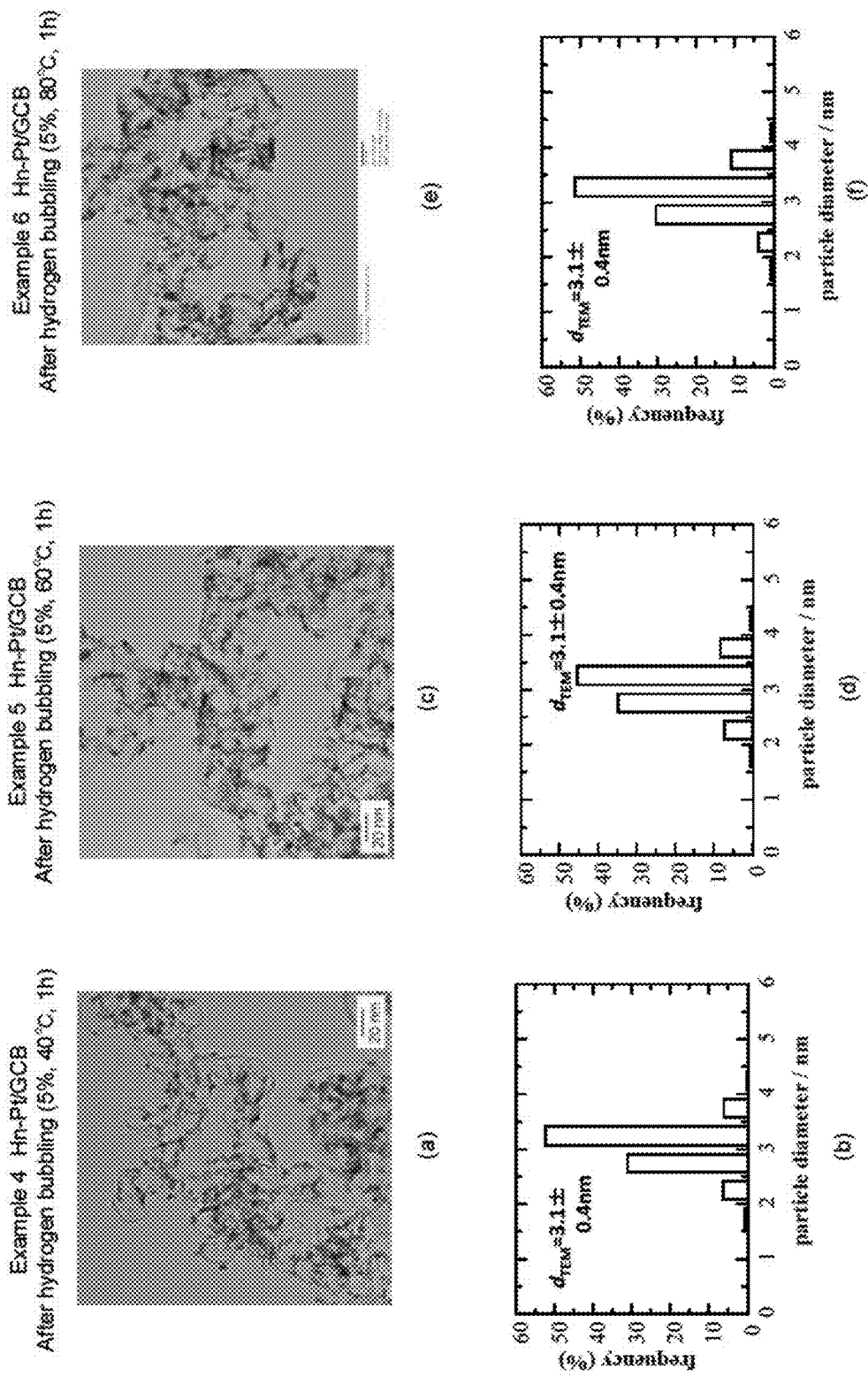
FIG. 3 shows a summary of the study regarding the effect of the reducing temperatures (40, 60, and 80° C.) under the reducing conditions of 5% hydrogen and 1 hour, with respect to Examples 4 to 6. Here, (a) and (b) are TEM image of the sample after hydrogen bubbling (Example 4) (Hn-Pt/GCB) and particle diameter distribution obtained from the image, respectively; (c) and (d) are TEM image of the sample after hydrogen bubbling (Example 5) (Hn-Pt/GCB) and particle diameter distribution obtained from the image, respectively; and (e) and (f) are TEM image of the sample after hydrogen bubbling (Example 6) (Hn-Pt/GCB) and particle diameter distribution obtained from the image, respectively. There was no remarkable difference in the catalyst generated, among the reducing temperatures.

In Examples 4 to 6, the temperature of the reaction solution during the hydrogen bubbling was altered to 40° C., 60° C., and 80° C., and the experiment and evaluation were performed in a similar manner as Example 3. The results are shown in FIG. 3(a) to (f). As shown in FIGS. 3(a), (c), and (e), it can be understood that the particle diameter of each of the Pt fine particles supported on GCB were made large. In addition, as shown in FIGS. 3(b), (d), and (e), the average particle diameter $d_{TEM}$ was increased by approximately 0.9 nm. In addition, when the particle diameter distributions of Examples 1 to 6 are compared with each other, it can be understood that the width of the particle diameter distribution of Examples 4 to 6 are narrower than those of the Examples 1 to 3. Accordingly, the reduction conditions of Examples 4 to 6 are more preferable.

5. Example 7 n-PtCo/GCB+Pt Skin (Hn-PtCo/GCB), 5% Hydrogen Bubbling, 20° C., 1 h)

5-1. Preparation of n-PtCo/GCB

Pt(acac)$_2$ (0.125 mmol, 49 mg), Co(acac)$_3$ (0.125 mmol, 44 mg), 1,2-hexadecanediol (1 mmol, 260 mg), and diphenyl ether (12.5 ml, 13.5 g, 79.3 mmol) were charged in a beaker, and the mixture was agitated and mixed for 10 minutes at an elevated temperature of 100° C. using a stirrer. Subsequently, oleic acid (0.25 mmol, 85 μl) and oleylamine (0.25 mmol, 85 μl) were added, and the temperature was raised to 200° C. with agitation. Then, the mixture was further agitated for 20 minutes to give a nano-capsule solution. To the nano-capsule solution thus obtained, 1M LiB(C$_2$H$_5$)$_3$H·THF solution (1.0 ml, 1 mmol) was added dropwise over 2 minutes, and the mixture was agitated for 5 minutes. Then, the temperature of the mixture was raised to 260° C., and the reduction reaction was carried out at this temperature under reflux for 20 minutes. Accordingly, solution A containing PtCo particles in the nano-capsule was obtained. Then, solution A was cooled to approximately 100° C., and graphite carbon black (GCB, 150 m$^2$/g) was added so that the amount of PtCo supported would be 27.2 wt % with respect to the amount of carbon black. The mixture was agitated, filtered, and the filtrate was subjected to vacuum drying at 60° C. Subsequently, the remaining organic solvent was removed by heating under nitrogen gas at 200° C. for 4 hours to obtain the PtCo fine particles supported on GCB, n-PtCo/GCB. Subsequently, thermal treatment under an atmosphere of 100% hydrogen gas was performed at 200° C. for 1 hour in order to allow deposition of Pt at the surface of PtCo fine particles.

Figure 4:
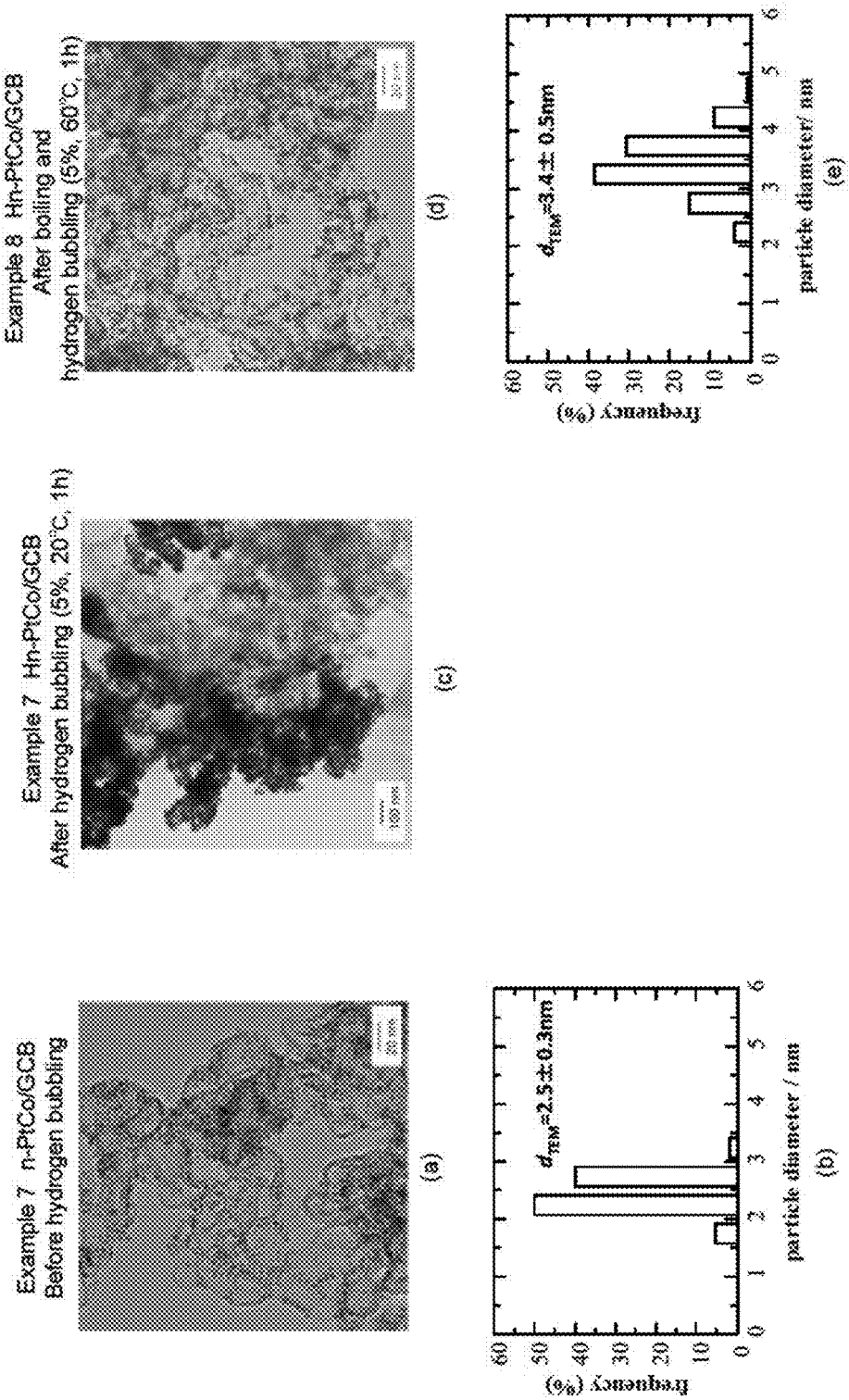
FIG. 4 shows a summary of the study regarding the formation of the Pt skin layer on the n-PtCo/GCB seeds of fine metal particles with respect to Examples 7 and 8. Here, (a) is a TEM image of the seeds of fine metal particles; (b) is a particle diameter distribution obtained from the image; (c) is a TEM image of the sample after hydrogen bubbling (Example 7, similar reducing temperature and period as Example 3) (Hn-PtCo/GCB). Pt precursor was fully reduced, however, most of them were deposited as a bulk, and thus it was not able to analyze its particle diameter distribution. In Example 8, prior to hydrogen bubbling, the reaction solution was boiled, cooled to 60° C., and then reducing treatment was carried out by hydrogen bubbling in a similar manner as the plain Pt. Here, (d) and (e) are TEM image of the sample after hydrogen bubbling (Hn-PtCo/GCB) and particle diameter distribution obtained from the image, respectively. By performing the boiling treatment before reducing, the particle diameter was increased as desired.

TEM image of n-PtCo/GCB and particle diameter distribution are shown in FIG. 4(a) to (b). It can be understood that the PtCo fine particles are dispersed uniformly, and the width of the particle diameter distribution is extremely narrow.

5-2. Hydrogen Bubbling

The reaction solution was prepared in a similar manner as in Example 1-3, and hydrogen bubbling was performed at 20° C. for 1 hour using 5% hydrogen gas. TEM image taken for the resulting sample (Hn-PtCo/GCB) is shown in FIG. 4(c). The left side of the image is darker than the right side of the image, which shows that PtCo fine particles grew ununiformly.

Detailed analysis was conducted to solve the reason for such results, and reached a hypothesis that n-PoCo/GCB had slight water repelling property, and thus n-PtCo/GCB was not able to contact the reaction solution sufficiently.

6. Example 8 n-PtCo/GCB+Pt Skin (Hn-PtCo/GCB), Boiling+5% Hydrogen Bubbling, 60° C., 1 h 6-1. Hydrogen Bubbling Based on the hypothesis of Example 7, the reaction solution was boiled before performing hydrogen bubbling, in order to improve the wettability of n-PtCo/GCB. At the beginning of boiling, n-PtCo/GCB partially floated in the reaction solution or at the surface of the reaction solution. When boiling was carried out for approximately 10 minutes, the whole amount of n-PtCo/GCB precipitated at the bottom of the container, and the boiling was terminated. Subsequently, the reaction solution was allowed to stand to reach 60° C., and then hydrogen bubbling was conducted. As a result, as shown in FIG. 4(d) to (e), Pt skin layer was formed uniformly on the surface of each of the PtCo fine particles.

6-2. Line Analysis by STEM-EDX

Figure 5:
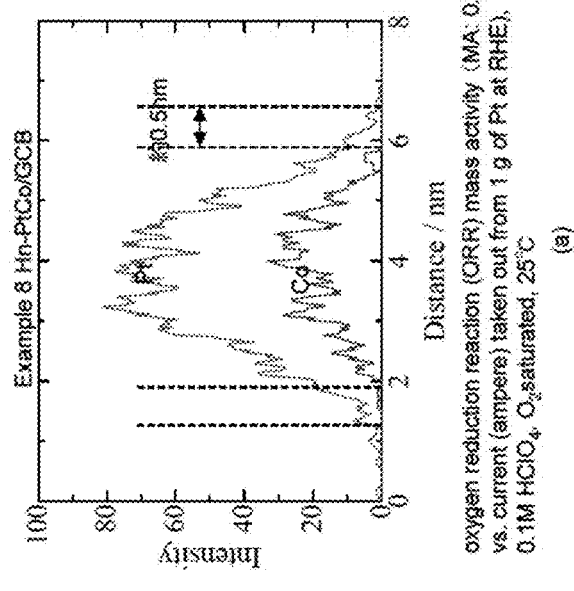
In FIG. 5, (a) shows the result of conducting a line analysis by STEM-EDX with respect to the sample after reaction solution boiling and hydrogen bubbling (Example 8) (Hn-PtCo/GCB). Here, (b) is a graph showing the comparison among the sample after hydrogen bubbling (Example 8), commercially available standard simple platinum catalyst (hereinafter abbreviated as c-Pt/CB) supported on conventional large area carbon black carrier, and PtCo alloy catalyst supported on the same graphitized carbon black carrier (2n-PtCo/GCB) obtained in Example 5; regarding the oxygen reduction reaction (ORR) mass activity. Among these, Hn-PtCo/GCB showed the maximum mass activity.
Figure 5:
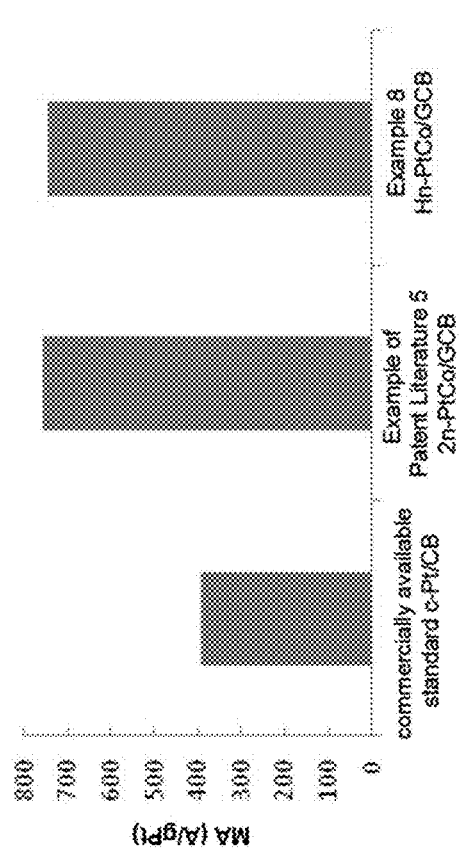

Line analysis by scanning transmission electron microscope energy dispersive X-ray spectroscopy (STEM-EDS) was conducted with the PtCo fine particles covered with Pt skin layer (Hn-PtCo/GCB). The results are shown in FIG. 5(a). As can be understood from FIG. 5(a), Pt and Co co-exist at the center, while only Pt exist in the region of approximately 0.5 nm from both ends. These results show that the Pt skin layer was formed with a thickness of approximately 0.5 nm.

6-3. Mass Activity

Next, the result for the ORR activity evaluation of this Pt skin/PtCo/GC catalyst (Hn-PtCo/GCB) is shown in FIG. 5(b). In FIG. 5(b), the vertical axis shows the oxygen reduction reaction (ORR) activity (current (ampere) taken out from 1 g of Pt), and its unit is A/gPt. As shown in FIG. 5(b), the mass activity (ORR activity per unit mass of Pt, MA) is improved by approximately 2 times with respect to commercially available c-Pt/CB catalyst at 0.85 V. In addition, the activity was at a same level as the PtCo alloy of Example 1 in Patent Literature 5. Here, the total time period required for manufacturing the catalyst in Example 8 of the present invention was approximately ¼ of the Example 1 in Patent Literature 5. It is surprising that a performance of same level was exhibited with such short period of time. Here, in the present Examples, the time period for performing the hydrogen bubbling was 1 hour, however, since the reaction solution was almost colorless and transparent after 30 minutes, the time period of manufacture can be further shortened.

7. Example 9 n-Pt/GCB, 5% hydrogen bubbling for first and second time

Figure 6:
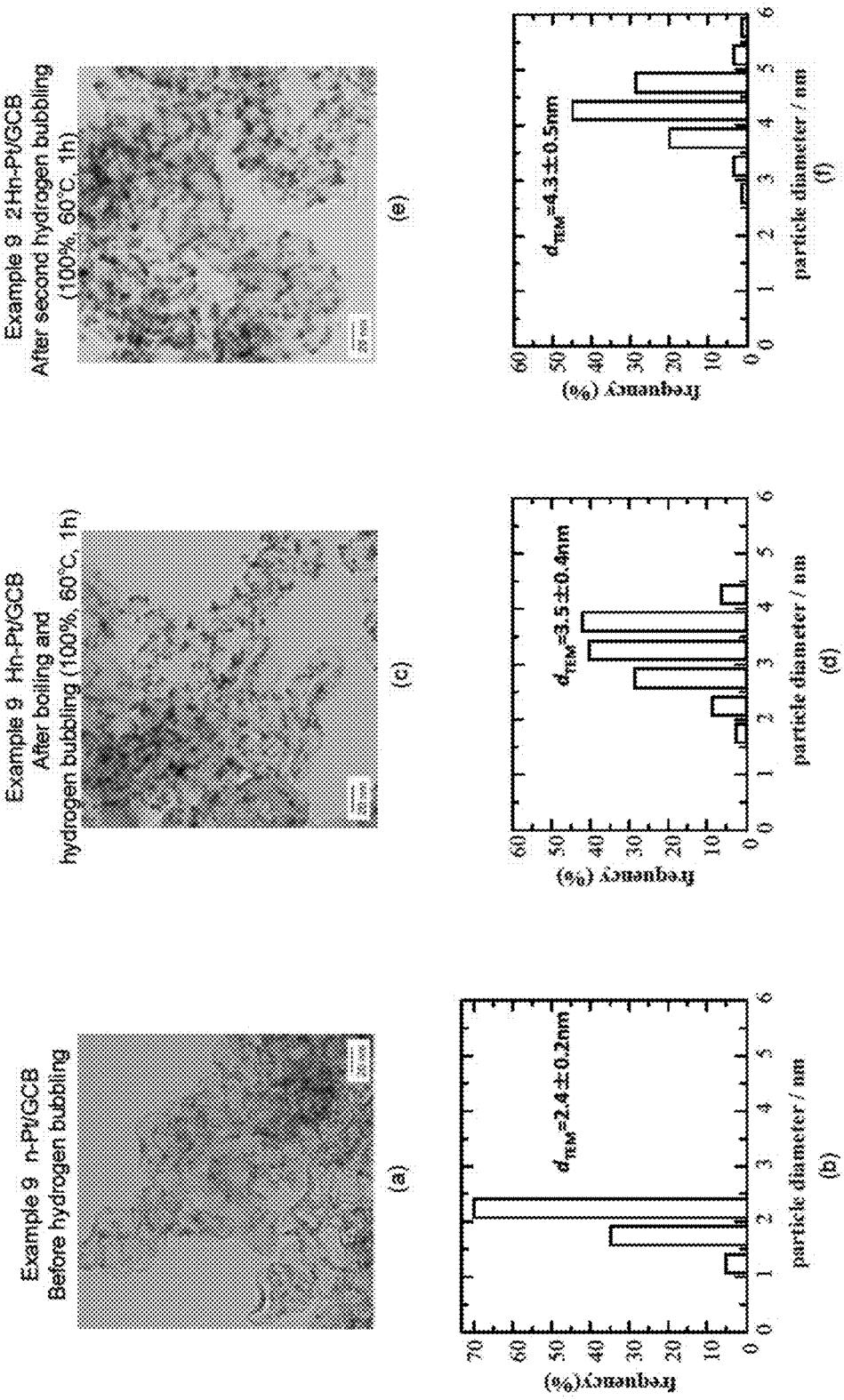
FIG. 6 shows the results of Example 9, where possibility of controlling the particle diameter distribution while maintaining the condition of dispersion on the carrier was investigated using the same seeds of fine metal particles. Here, (a) and (b) are TEM image of seeds of fine metal particles n-Pt/GCB and particle diameter distribution obtained from the image, respectively; (c) and (d) are TEM image of the sample after the first hydrogen bubbling (Example 9) (Hn-Pt/GCB) and particle diameter distribution obtained from the image, respectively; and (e) and (f) are TEM image of the sample (2Hn-Pt/GCB) obtained by removing the supernatant liquid after the first hydrogen bubbling (Example 9), followed by the second hydrogen bubbling in the precursor-containing aqueous solution as of the first hydrogen bubbling of Example 9 and particle diameter distribution obtained from the image, respectively. As intended, platinum deposited in double, and catalyst with intended particle diameter was generated.

The reaction solution was prepared in a similar manner as in Example 1-3, and then 10 minutes of boiling treatment was performed. Subsequently, hydrogen bubbling was performed at 60° C. for 1 hour using 5% hydrogen gas. Then, the supernatant liquid was removed, and Pt skin precursor solution obtained by dissolving hexachloroplatinic (IV) acid (H$_2$PtCl$_6$·6H$_2$O) in an amount for 2 atom layers of Pt in purified water (10 mL) was added. The hydrogen bubbling was performed again at 60° C. for 1 hour using 5% hydrogen gas. The results of the first hydrogen bubbling (Hn-Pt/GCB) and the second hydrogen bubbling (2Hn-Pt/GCB) are shown in FIG. 6 along with the result obtained with the seeds of Pt fine particles catalyst (n-Pt/GCB). As shown in FIG. 6, each time the hydrogen bubbling is performed in the presence of the Pt skin precursor solution for 2 atom layers of Pt, the average particle diameter of the fine particles after the reaction became larger by 2 atom layers of Pt.

8. Example 10

Relation Between the Value of pH of the Reaction Solution and the Rate of Reduction of Pt Skin Precursor With the method of Example 1, 7 types of reaction solutions were prepared by altering the concentration of Pt skin precursor in the Pt skin precursor solution. Since the amount of hydrogen ion released would increase as the concentration of the Pt skin precursor increases, the value of pH of these 7 reaction solutions are different from each other.

Figure 7:
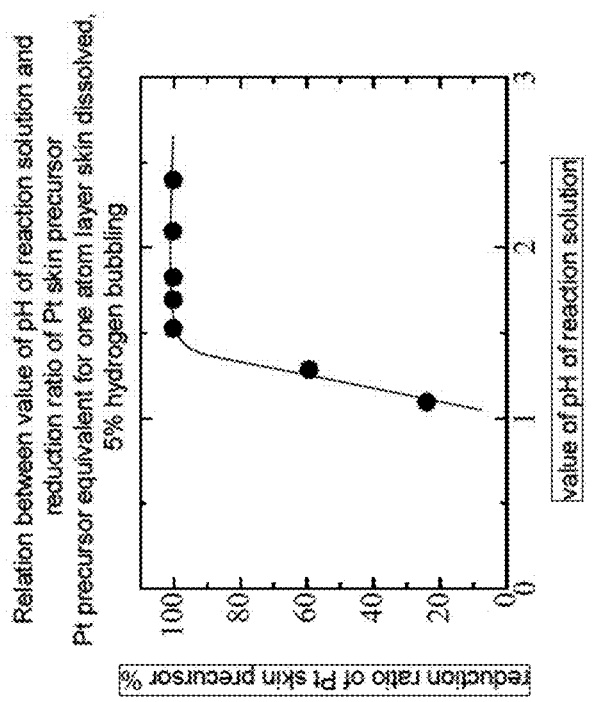
FIG. 7 is a graph showing the relation of pH of the precursor reaction solution having different concentration and Pt ion reducing rate, when the reduction was conducted under the conditions of 5% hydrogen, 40° C., and 1 hour. Here, with the condition of pH<1, deposition of Pt was not observed. With the condition of 100% hydrogen, the limit of the value of pH was extended to nearly zero.

To these reaction solutions, hydrogen bubbling was performed at 60° C. for 1 hour using 5% hydrogen gas. FIG. 7 shows the result obtained by plotting the value of pH of the reaction solution against the reduction ratio of the Pt skin precursor. The reduction ratio of the Pt skin precursor was obtained by analyzing the amount of platinum precursor existing in the filtrate after the reaction by ICP analysis, and the value of pH was measured with a commercially available pH meter using a glass electrode. From FIG. 7, it can be understood that the reduction rate is approximately 100% with the value of pH being approximately 1.5 or higher. When the value of pH becomes lower than such range, the reduction ratio of the Pt skin precursor dropped dramatically. This result shows that when the value of pH is too low, it becomes difficult for the reduction reaction to occur. However, Example 10 is a result obtained for a case where the hydrogen gas concentration is 5%, and thus it is considered that when the hydrogen gas concentration is increased, the reduction reaction of the Pt skin precursor would proceed even when the value of pH of the reaction solution is lower.

The invention claimed is:

1. A method of manufacturing fine metal particles, comprising the step of:
    a hydrogen bubbling step to perform bubbling to a reaction solution, wherein:
    the reaction solution is prepared by allowing seed fine metal particles in a dispersed state and a water-soluble noble metal precursor to co-exist in a water-containing solvent;
    the seed fine metal particles are not soluble in the water-containing solvent;
    the seed fine metal particles are an alloy of noble metal and non-noble metal;
    the water-soluble noble metal precursor is selected from the group consisting of an acid of noble metal, a salt of noble metal, and a complex of noble metal;
    the bubbling is performed with a reaction gas containing a hydrogen gas, and
    a noble metal skin layer is formed so as to cover the seed fine metal particles.

2. The method of claim 1, wherein an average particle diameter of the seed fine metal particles is 1 to 8 nm.

3. The method of claim 1, wherein the seed fine metal particles are supported on a carrier and are dispersed.

4. The method of claim 1, wherein a value of pH of the reaction solution when the bubbling is started is 0 or higher.

5. The method of claim 1, further comprising the step of:
    a boiling step to boil the reaction solution before the hydrogen bubbling step.

6. The method of claim 1, wherein the water-containing solvent is removed after the hydrogen bubbling step, followed by addition of the water-soluble noble metal precursor and the water-containing solvent, and then the hydrogen bubbling is performed again.

7. The method of claim 1, wherein the reaction gas has a hydrogen gas concentration of 0.1 to 100%.

8. The method of claim 1, wherein the hydrogen bubbling step is terminated when a concentration of the water-soluble noble metal precursor in the reaction solution becomes 10% or lower.

9. The method of claim 1, further comprising the step of:
    a thermal treatment step to perform a thermal treatment with the seed fine metal particles under reductive atmosphere before adding the seed fine metal particles to the reaction solution.

10. The method of claim 1, wherein:
    the noble metal of the seed fine metal particles comprises at least one metal selected from the group consisting of platinum, palladium, rhodium, iridium, ruthenium, and gold; and
    the non-noble metal of the seed fine metal particles comprises at least one metal selected from the group consisting of iron, cobalt, nickel, manganese, chromium, vanadium, titanium, niobium, molybdenum, lead, and tungsten.

11. The method of claim 1, wherein the noble metal in the acid of noble metal, salt of noble metal, and complex of noble metal comprises at least one noble metal selected from the group consisting of platinum, palladium, rhodium, iridium, ruthenium, and gold.

12. The method of claim 1, wherein the water-soluble noble metal precursor is selected from the group consisting of chloroplatinic acid, chloroplatinate salt, and platinum ammine complex.

13. The method of claim 1, wherein:
    the seed fine metal particles are supported on an electron conductive carrier; and
    the seed fine metal particles are an electrode catalyst of fuel cell.

* * * * *